United States Patent
Kwon et al.

(10) Patent No.: US 12,470,453 B2
(45) Date of Patent: Nov. 11, 2025

(54) ENCODER-INTEGRATED TRANSMITTER AND TELEMETRY SYSTEM INCLUDING THE SAME

(71) Applicant: AGENCY FOR DEFENSE DEVELOPMENT, Daejeon (KR)

(72) Inventors: Younggap Kwon, Daejeon (KR); Dae Yeon Kim, Daejeon (KR); Chiho Hwang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 56 days.

(21) Appl. No.: 18/508,820

(22) Filed: Nov. 14, 2023

(65) Prior Publication Data
US 2024/0171448 A1    May 23, 2024

(30) Foreign Application Priority Data
Nov. 15, 2022   (KR) .......................... 10-2022-0152924

(51) Int. Cl.
*H04L 27/36*   (2006.01)
(52) U.S. Cl.
CPC .................................... *H04L 27/36* (2013.01)
(58) Field of Classification Search
CPC .............................. H04L 27/36; H04L 27/365
See application file for complete search history.

(56) References Cited

U.S. PATENT DOCUMENTS

| 3,826,868 A * | 7/1974 | Nugent ...................... H04J 4/00 |
|---|---|---|
| | | 340/870.18 |
| 10,408,049 B2 | 9/2019 | Bhongale et al. |
| 11,049,273 B2 | 6/2021 | Kirk et al. |

FOREIGN PATENT DOCUMENTS

| KR | 20130033126 A | 4/2012 | |
| KR | 20120098217 A | 9/2012 | |
| KR | 20140122702 A | 10/2014 | |
| KR | 20140146655 A | 12/2014 | |
| KR | 20160099612 A | 8/2016 | |
| KR | 20170001597 A | 1/2017 | |
| KR | 101711543 B1 | 3/2017 | |
| WO | WO-2005067161 A1 * | 7/2005 | ............. H04B 1/692 |
| WO | WO-2022129880 A1 * | 6/2022 | ............. H03D 7/165 |
| WO | WO-2024097865 A2 * | 5/2024 | |

* cited by examiner

*Primary Examiner* — Freshteh N Aghdam
(74) *Attorney, Agent, or Firm* — Dilworth & Barrese, LLP.; Michael J. Musella, Esq.

(57) ABSTRACT

An encoder-integrated transmitter includes an encoder-integrated modulation unit including one field programmable gate array (FPGA) to control a measurement module, configured to collect measurement data from the measurement module to configure transmission frame data, and modulate the transmission frame data into a digital modulation signal and an amplification unit configured to convert the digital modulation signal into a passband analog radio frequency (RF) signal and then amplify the passband analog RF signal to a high power.

14 Claims, 6 Drawing Sheets

PRIOR ART

ENCODER-INTEGRATED TRANSMITTER AND TELEMETRY SYSTEM INCLUDING THE SAME

CROSS-REFERENCE TO RELATED APPLICATION

This application claims priority to and the benefit of Korean Patent Application 5 No. 10-2022-0152924 filed in the Korean Intellectual Property Office on Nov. 15, 2022, the entire contents of which are incorporated herein by reference.

BACKGROUND

(a) Field

Embodiments of the present invention relates to an encoder-integrated transmitter and a telemetry system including the same.

(b) Description of the Related Art

A telemetry system is a system that measures various sensor data and status information data for various components within an aircraft and wirelessly transmits the results to the ground.

FIG. 1 is a block diagram illustrating an example of a telemetry system of the related art. A telemetry system 100 of the related art mainly includes a power module 110 that supplies power, a plurality (N) of measurement modules 120 that measure status information within an aircraft, an encoder module 130 that controls the measurement module 120 and collects measurement data to configure analog transmission frame data, and a transmission module 140 that modulates the transmission frame data into an analog radio frequency (RF) signal and outputs the analog RF signal through an antenna 150. Here, the transmission module 140 is divided into a modulation unit 141 which is a digital region and an amplification unit 142 which is an analog region. The modulation unit 141 modulates analog transmission frame data into a baseband digital modulation signal and outputs the same, and the amplification unit 142 converts the digital modulation signal into a passband analog RF signal, amplifies the passband an analog RF signal, amplifies the analog RF signal to a high power, and outputs the amplified high power through the antenna 150.

In the telemetry system 100 of the related art, the encoder module 130 transmits transmission frame data generated in a field programmable gate array (FPGA) 131 to an FPGA 141 of the transmission module 140 in the form of an analog signal. Here, jitter occurs between the FPGAs 131 and 141 operating as heterogeneous oscillators, which causes phase noise in the RF signal.

FIG. 2 is a block diagram illustrating an example of a modulation unit of the related art. The modulation unit 141 of the telemetry system 100 of the related art mainly uses a modulation method of continuous phase modulation (CPM). As illustrated in FIG. 2, the modulation unit 141 of the CPM modulation method includes an oversampler 1411, a frequency pulse filter 1412, an interpolator 1413, a digital integrator 1414, and a quadrature modulator 1415. The oversampler 1411 simply oversamples a transmission message stream (a stream of the transmission frame data in FIG. 1). The frequency pulse filter 1412 removes a high-frequency component of the oversampled transmission message stream. The interpolator 1413 performs a function of interpolating data between input data (transmission message stream from which the high-frequency component has been removed) so that output data is smooth. The digital integrator 1414 and the quadrature modulator 1415 generate in-phase and quadrature components of the CPM modulation signal.

The transmission message stream input to the modulation unit 141 of the CPM modulation method of the related art is transmitted at a message rate, the oversampler 1411 and frequency pulse filter 1412 are operated by a clock at an oversample rate of the message rate, and the interpolator 1413, the digital integrator 1414, and the quadrature modulator 1415 are operated by a clock of a system operating frequency. As heterogeneous clocks are used between the oversampler 1411, the frequency pulse filter 1412, the interpolator 1413, the digital integrator 1414, and the quadrature modulator 1415, clock domain crossing (CDC) issue should be considered.

In addition, in the modulation unit 141 of the CPM modulation method of the related art, the frequency pulse filter 1412 and the interpolator 1413 are designed based on a finite impulse response (FIR) filter, so a plurality of multipliers should be provided in the FPGA. This not only increases FPGA implementation complexity but also reduces design freedom.

SUMMARY

Embodiments of the present invention attempts to provide an encoder-integrated transmitter in which an encoder function and a transmission modulation function are integrated in one field programmable gate array (FPGA) to reduce the complexity of FPGA implementation and reduce phase noise of an RF signal, and a telemetry system including the same.

An encoder-integrated transmitter according to an exemplary embodiment of the present invention includes: an encoder-integrated modulation unit including one field programmable gate array (FPGA) to control a measurement module, configured to collect measurement data from the measurement module to configure transmission frame data, and modulate the transmission frame data into a digital modulation signal; and an amplification unit configured to convert the digital modulation signal into a passband analog radio frequency (RF) signal and then amplify the passband analog RF signal to a high power.

The encoder-integrated modulation unit may include: an encoder unit configured to control the measurement module and collect the measurement data to configure the transmission frame data; and a modulator configured to modulate the transmission frame data into the digital modulation signal, wherein the encoder unit generates the transmission frame data as a digital signal.

The modulation unit may include: a look-up table-based frequency pulse filter configured to calculate an argument according to a stream of the transmission frame data input from the encoder unit and output an output value corresponding to the argument calculated from a look-up table; a digital integrator configured to digitally integrate a signal output from the look-up table-based frequency pulse filter; and a quadrature modulator configured to modulate a signal digitally integrated by the digital integrator into an in-phase component and a quadrature component and output the in-phase component and the quadrature component. p The look-up table-based frequency pulse filter, the digital integrator, and the quadrature modulator may be operated by a single clock having a system operating frequency.

The look-up table-based frequency pulse filter may include: a message delay unit including a plurality of sequentially connected delay gates to sequentially delay and output the stream of transmission frame data; a lower argument calculation unit configured to calculate a lower argument using a system operating frequency and a message transfer rate; and a look-up table unit configured to output an output value corresponding to an argument including an upper argument including an input value of the message delay unit and an output value of each of the plurality of delay gates and the lower argument.

The look-up table-based frequency pulse filter may include: a message delay unit configured as one delay gate to output a current transmission message of the transmission frame data and a previous transmission message delayed by the delay gate; a lower argument calculation unit configured to calculate a lower argument using a system operating frequency and a message transfer rate; a look-up table unit including a look-up table that pre-holds output values for each of the lower arguments and configured to output values corresponding to the lower arguments; and a filter output determining unit configured to determine an output value using the previous transmission message and the current transmission message transferred from the message delay unit as selection arguments.

The filter output determining unit may include: a multiplier configured to multiply a value transmitted from the look-up table unit by −1; and a 4:1 MUX configured to selectively output one of the value transmitted from the look-up table unit, the value 15 input through the multiplier, 0.5, and −0.5, using the previous transmission message and the current transmission message as selection elements.

The lower argument calculating unit may calculate the lower argument using equation $$d_n = \text{Round}\left(\frac{p_n}{f_s}D_l\right), p_n = \text{mod}(p_{n-1} + f_b, f_s),$$

wherein $f_\theta$ is a first constant value of the system operating frequency, $f_b$ is a second constant value of the message transfer rate, $D_1$ is a number of lower arguments, Round(a) denotes an integer closest to a, $P_0=0$, mod (a, b) denotes a modulo operation which is the remainder obtained by dividing a by b.

A telemetry system according to another exemplary embodiment of the present invention includes: a plurality of measurement modules configured to measure a plurality of status information; an encoder-integrated modulation unit including one field programmable gate array (FPGA) to control the plurality of measurement modules, configured to collect measurement data from the plurality of measurement modules to configure transmission frame data, and modulate the transmission frame data into a digital modulation signal; and an amplification unit configured to convert the digital modulation signal into a passband analog radio frequency (RF) signal and then amplify the passband analog RF signal to a high power.

The encoder-integrated modulation unit may include: an encoder unit configured to control the measurement module and collect the measurement data to configure the transmission frame data; and a modulator configured to modulate the transmission frame data into the digital modulation signal, wherein the encoder unit generates the transmission frame data as a digital signal.

The modulation unit may include: a look-up table-based frequency pulse filter configured to calculate an argument according to a stream of the transmission frame data input from the encoder unit and output an output value corresponding to the argument calculated from a look-up table; a digital integrator configured to digitally integrate a signal output from the look-up table-based frequency pulse filter; and a quadrature modulator configured to modulate a signal digitally integrated by the digital integrator into an in-phase component and a quadrature component and output the in-phase component and the quadrature component.

The look-up table-based frequency pulse filter, the digital integrator, and the quadrature modulator may be operated by a single clock having a system operating frequency.

The look-up table-based frequency pulse filter may include: a message delay unit including a plurality of sequentially connected delay gates to sequentially delay and output a stream of transmission frame data; a lower argument calculation unit configured to calculate a lower argument using a system operating frequency and a message transfer rate; and a look-up table unit configured to output an output value corresponding to an argument including an upper argument including an input value of the message delay unit and an output value of each of the plurality of delay gates and the lower argument.

The look-up table-based frequency pulse filter may include: a message delay unit configured as one delay gate to output a current transmission message of the transmission frame data and a previous transmission message delayed by the delay gate; a lower argument calculation unit configured to calculate a lower argument using a system operating frequency and a message transfer rate; a look-up table unit including a look-up table that pre-holds output values for each of the lower arguments and configured to output values corresponding to the lower arguments; and a filter output determining unit configured to determine an output value using the previous transmission message and the current transmission message transferred from the message delay unit as selection arguments.

The filter output determining unit may include: a multiplier configured to multiply a value transmitted from the look-up table unit by −1; and a 4:1 MUX configured to selectively output one of the value transmitted from the look-up table unit, the value input through the multiplier, 0.5, and −0.5, using the previous transmission message and the current transmission message as selection elements.

The lower argument calculating unit may calculate the lower argument using equation $$d_n = \text{Round}\left(\frac{p_n}{f_s}D_l\right), p_n = \text{mod}(p_{n-1} + f_b, f_s),$$

wherein $f_\theta$ is a first constant value of the system operating frequency, $f_b$ is a second constant value of the message transfer rate, $D_1$ is a number of lower arguments, Round (a) denotes an integer closest to a, $p_0 = 0$, mod (a, b) denotes a modulo operation which is the remainder obtained by dividing a by b.

The encoder-integrated transmitter according to an exemplary embodiment of the present invention implements the encoder function and the transmission modulation function in one FPGA, thereby minimizing phase noise of an RF signal, which is a final output of the transmission module, and reducing a shape size of the telemetry system. Accordingly, space utilization within a narrow aircraft may be improved.

A look-up table-based frequency pulse filtering method according to an exemplary embodiment of the present invention may minimize the use of a multiplier, and in some cases, do not use a multiplier at all. Accordingly, the complexity of FPGA implementation may be lowered and the freedom of using multipliers in encoder function design may increase. The low-complexity design results enable the application of low-cost FPGAs and reduce system production costs. In addition, a message transfer rate of the telemetry system may be freely adjusted, without changing hardware, by simply changing a message transfer rate of an input constant value of a lower argument calculation unit of a look-up table-based frequency pulse filter.

DETAILED DESCRIPTION

Figure 1:
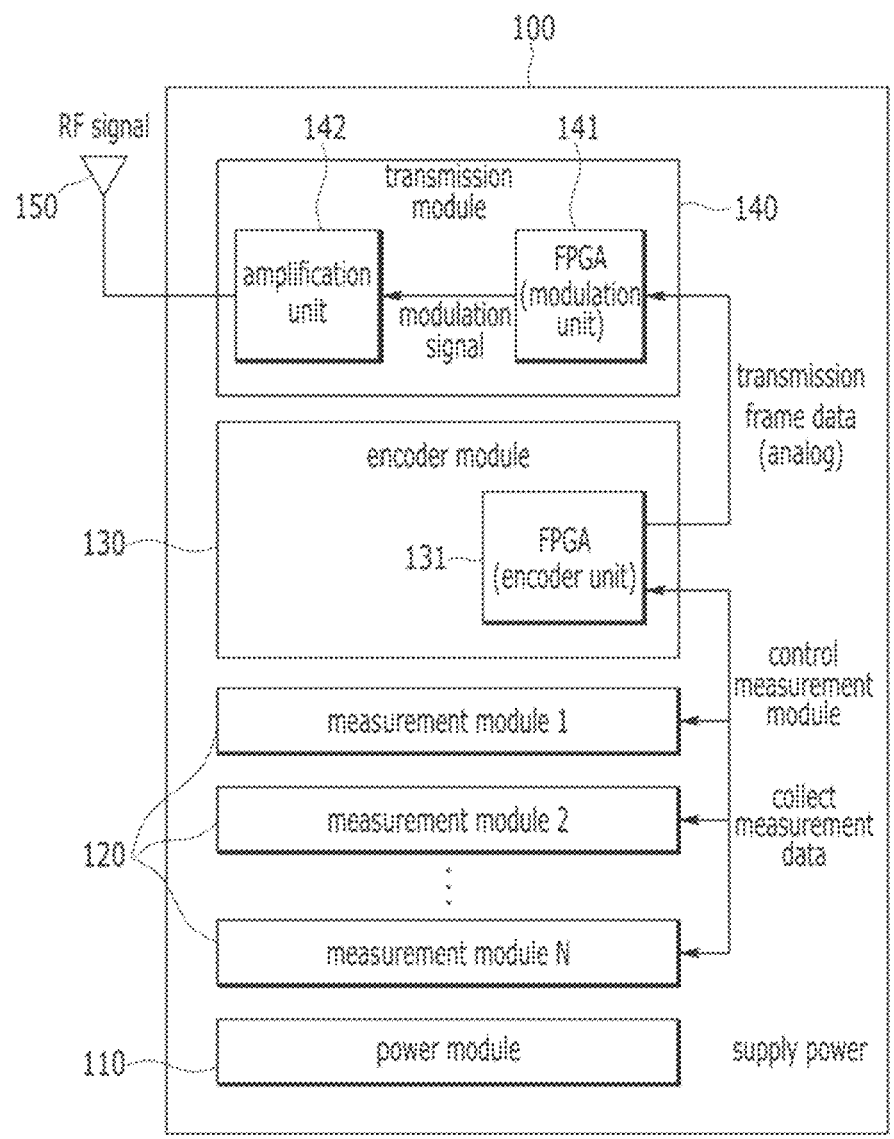
FIG. 1 is a block diagram illustrating an example of a telemetry system of the related art.

Hereinafter, exemplary embodiments of the present invention will be described in detail with reference to the accompanying drawings to allow those skilled in the art to practice the present invention. The present invention may be implemented in various different forms and is not limited to the examples as described herein.

In the drawings, parts irrelevant to the description are omitted to clearly describe the present invention, and like reference numerals denote like elements throughout the specification.

Throughout the specification, unless explicitly described to the contrary, the word "comprise" will be understood to imply the inclusion of stated elements but not the exclusion of any other elements.

Figure 3:
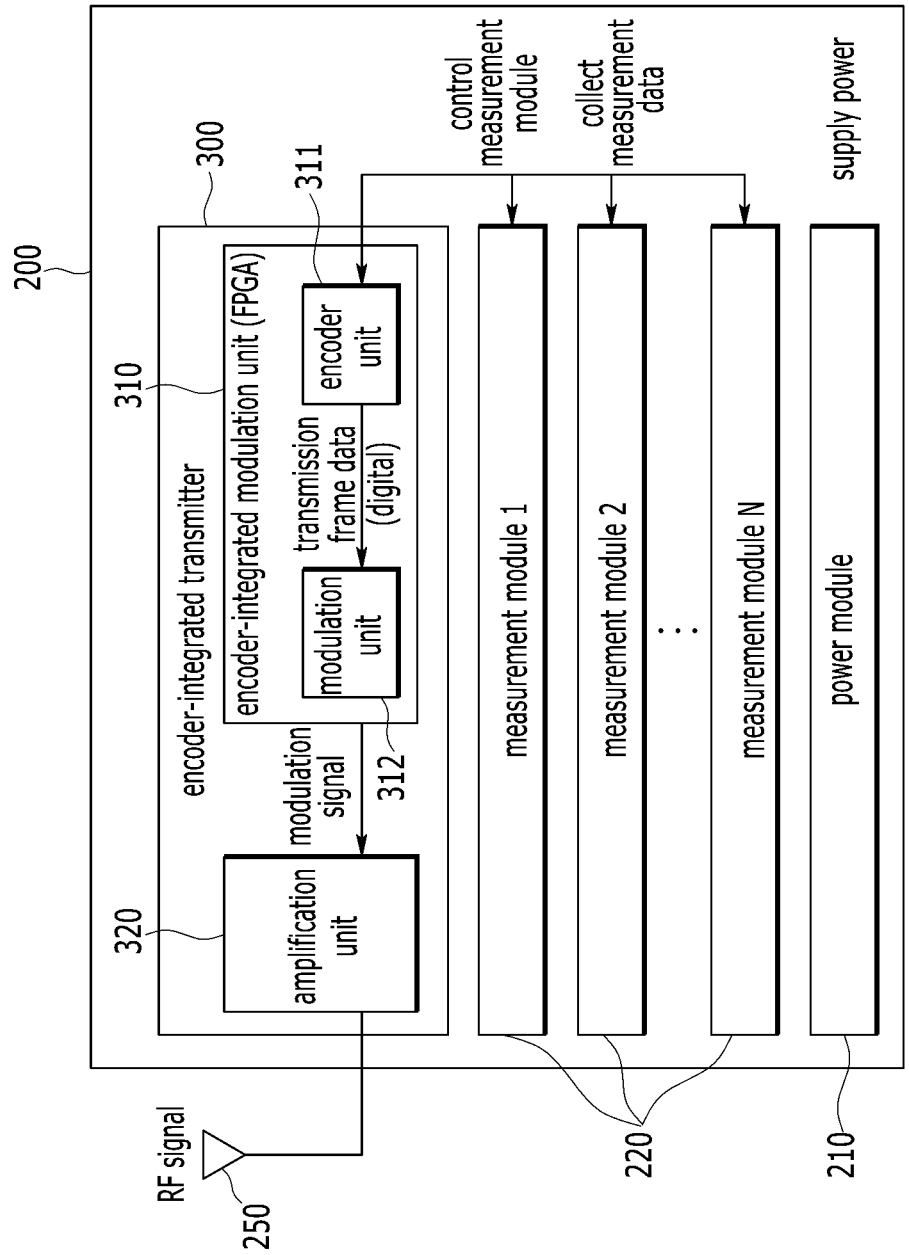
FIG. 3 is a block diagram illustrating a telemetry system according to an exemplary embodiment of the present invention.

FIG. 3 is a block diagram illustrating a telemetry system according to an exemplary embodiment of the present invention.

Referring to FIG. 3, a telemetry system 200 according to an exemplary embodiment of the present invention may include a power module 210, a plurality (N) of measurement modules 220, an encoder-integrated transmitter 300, and an antenna 250.

The power module 210 may supply overall power to the telemetry system 200.

The plurality (N) of measurement modules 220 may measure a number of status information within the aircraft.

The encoder-integrated transmitter 300 may include an encoder-integrated modulation unit 310 and an amplification unit 320, and the encoder-integrated modulation unit 310 may include an encoder unit 311 and a modulation unit 312 to configure one PGA.

The encoder-integrated modulation unit 310 may not only function as an encoder that controls the measurement module 220 and collects measurement data from the measurement module 220 to form transmission frame data, but also integrally function as a modulation unit that modulates the transmission frame data into an RF modulation signal. The encoder unit 311 of the encoder-integrated modulation unit 310 may control the measurement module 220, collect measurement data to configure digital transmission frame data and transmit the digital transmission frame data to the modulation unit 312. That is, the encoder unit 311 may generate the transmission frame data as a digital signal. The modulation unit 312 of the encoder-integrated modulation unit 310 may modulate the digital transmission frame data into a digital modulation signal and transmit the digital modulation signal to the amplification unit 320.

The amplification unit 320 may convert the digital modulation signal into a passband analog RF signal, amplify the analog RF signal to a high power, and output the same through the antenna 250.

Hereinafter, the modulation unit 312 of the encoder-integrated modulation unit 310 according to an exemplary embodiment of the present invention will be described in more detail with reference to FIG. 4.

Figure 4:
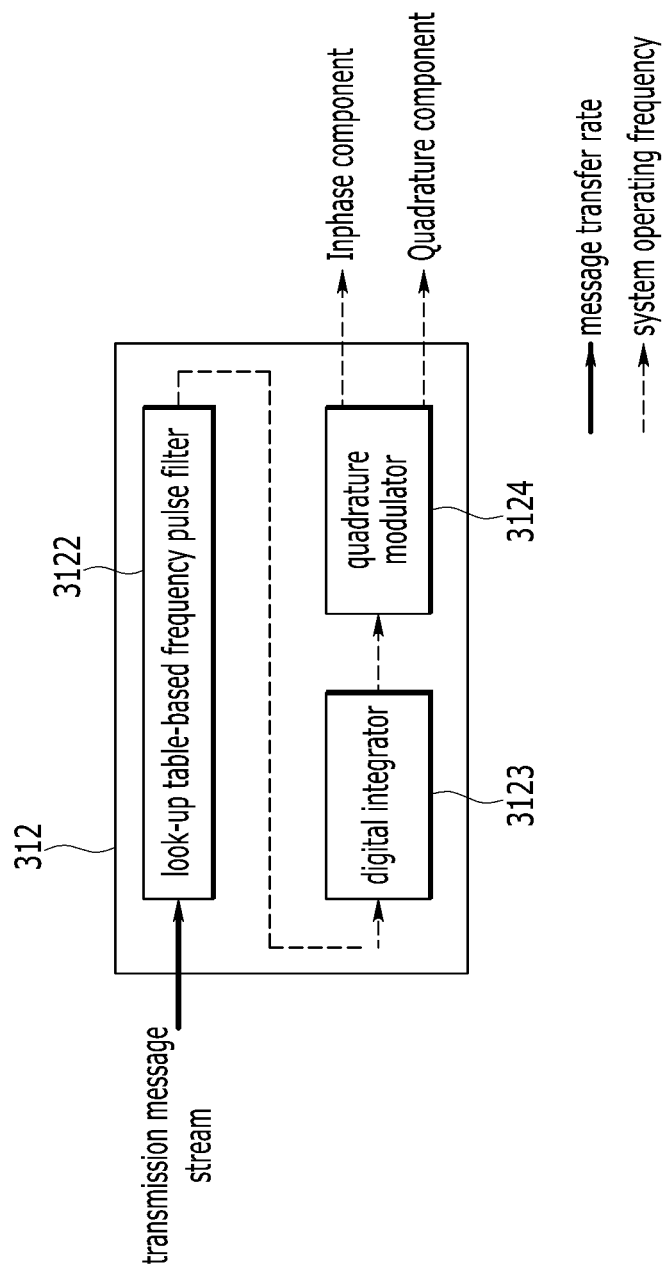
FIG. 4 is a block diagram illustrating a modulation unit of an encoder-integrated modulation unit according to an exemplary embodiment of the present invention.

FIG. 4 is a block diagram illustrating the modulation unit of the encoder-integrated modulation unit according to an exemplary embodiment of the present invention.

Referring to FIG. 4, the modulation unit 312 of the encoder-integrated modulation unit 310 may include a look-up table-based frequency pulse filter 3122, a digital integrator 3123, and a quadrature modulator 3124.

Figure 2:
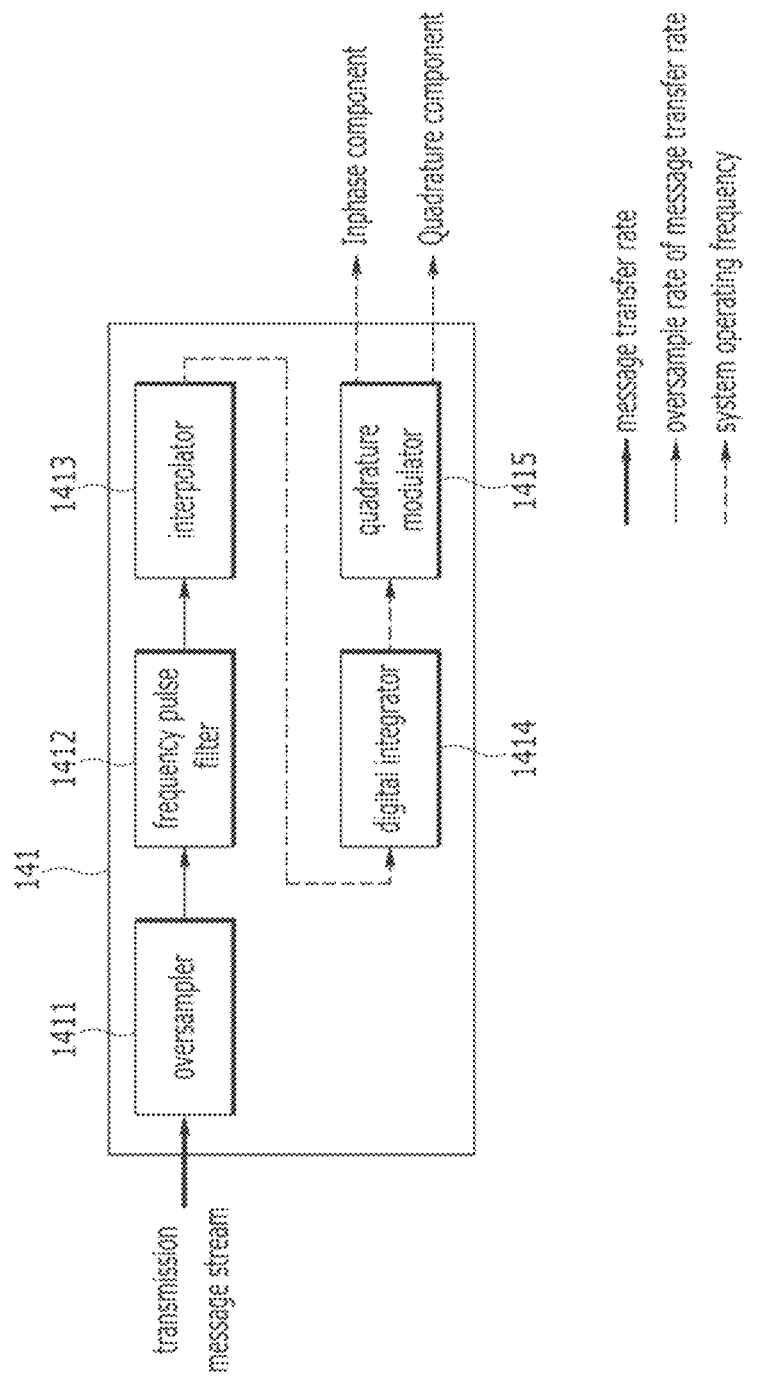
FIG. 2 is a block diagram illustrating an example of a modulation unit of the related art.

The look-up table-based frequency pulse filter 3122 may receive the digital transmission message stream from the encoder unit 311, removes a high-frequency component of a transmission message stream, and interpolate data between the input data to make output data smooth. That is, the look-up table-based frequency pulse filter 3122 may perform the function of a CPM modulation type frequency pulse filter 1412 and the interpolator 1413 of FIG. 2. The look-up table-based frequency pulse filter 3122 may calculate an argument according to a stream of transmission frame data and output an output value corresponding to the argument calculated from a look-up table. A more detailed description of the look-up table-based frequency pulse filter 3122 is described with reference to FIGS. 5 and 6.

The digital integrator 3123 may digitally integrate the signal output from the look-up table-based frequency pulse filter 3122, and the quadrature modulator 3124 may modulate the signal digitally integrated by the digital integrator 3123 into an in-phase component and a quadrature component and output the same.

The encoder unit 311 and the modulation unit 312 are configured as one FPGA, and the transmission message stream is input as a digital signal to the look-up table-based frequency pulse filter 3122, and all the look-up table-based frequency pulse filter 3122, the digital integrator 3123, and the quadrature modulator 3124 are driven by a single clock having a system operating frequency. Accordingly, phase noise of the RF signal, which is a final output of the encoder-integrated transmitter 300, may be minimized.

Hereinafter, the look-up table-based frequency pulse filter 3122 according to an exemplary embodiment of the present invention will be described in more detail with reference to FIG. 5.

Figure 5:
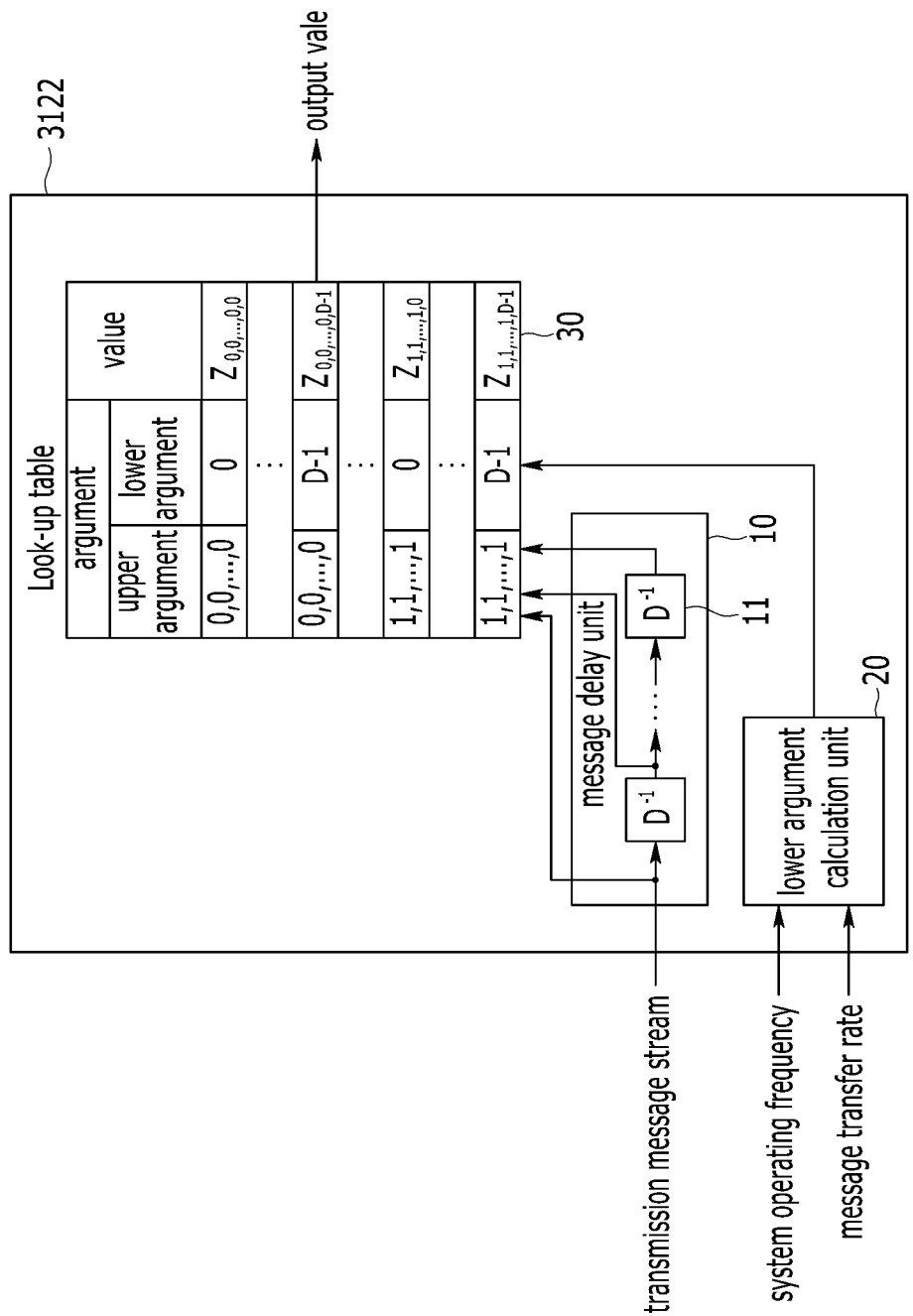
FIG. 5 is a block diagram illustrating a look-up table-based frequency pulse filter 10 according to an exemplary embodiment of the present invention.

FIG. 5 is a block diagram illustrating a look-up table-based frequency pulse filter according to an exemplary embodiment of the present invention.

Referring to FIG. 5, the look-up table-based frequency pulse filter 3122 may include a message delay unit 10, a lower argument calculation unit 20, and a look-up table unit 30.

The message delay unit 10 may include a plurality (N) of sequentially connected delay gates 11 and may delay an input transmission message stream. The transmission message stream may refer to a stream of digital transmission frame data in FIG. 3. The number (N) of delay gates 11 may be determined by the number of previous transmission messages that affect a current transmission message output. The plurality of delay gates 11 may be sequentially connected so that the transmission message stream may be sequentially output with delay and transferred to the look-up table unit 30.

The look-up table unit 30 may include a look-up table that previously has output values for each argument. The arguments of the look-up table may be divided into an upper argument and a lower argument. The upper argument includes (N+1) bits, and the upper argument (N+1) bits may be determined by a current transmission message, which is an input value of the message delay unit 10, and N previous transmission messages, which are an output value of the message delay unit 10. That is, the input value of the message delay unit 10 and the output value of each of the N delay gates 11 may be input as the upper argument of the look-up table unit 30.

The lower argument calculation unit 20 may receive a system operating frequency and a message transfer rate and calculate the lower argument using the received system operating frequency and the message transfer rate. In other words, the lower argument calculation unit 20 may calculate the lower argument $d_n$ using Equation 1 for each clock having the system operating frequency using a first constant value $f_s$ of the system operating frequency and a second constant value $f_b$ of the message transfer rate.

$$d_n = \text{Round}\left(\frac{p_n}{f_s} D_l\right) \quad \text{(Equation 1)}$$

$$p_n = \text{mod}(p_{n-1} + f_b, f_s)$$

Here, $D_l$ is the number of lower arguments, Round(a) denotes an integer closest to a, $p_0=0$, and denotes a modulo operation, which is the remainder obtained by dividing a by b.

The lower argument calculation unit 20 may input a lower argument calculated for each clock having the system operating frequency as a lower argument of the look-up table unit 30.

The value $Z_{m_0, m_1, \ldots, m_N, d}$ of the look-up table for each argument ($m_0, m_1, \ldots, m_N$, d) may be calculated using Equation 2.

$$Z_{m_0, m_1, \ldots, m_N, d} = h_{m_0, m_1, \ldots, m_N}\left(\frac{d}{D_l}\right) \quad \text{(Equation 2)}$$

Here, ($m_0, m_1, \ldots, m_N$) denotes the upper argument, $m_0 \in \{0,1\}$ denotes the current transmission message, $m_i \in \{0,1\}$ denotes a transmission message before i-th, $d \in \{0, 1, \ldots, D_l-1\}$ denotes the lower argument, and $h_{m_0, m_1, \ldots, m_N}(t)$ denotes a frequency pulse waveform for $\{m_i\}_{i=0}^N$ having a time axis normalized to $0 \le t \le 1$.

The look-up table unit 30 may output a value corresponding to arguments including an upper argument input from the message delay unit 10 and a lower argument input from the lower argument calculation unit 20, as an output value of the look-up table-based frequency pulse filter 3122.

Figure 6:
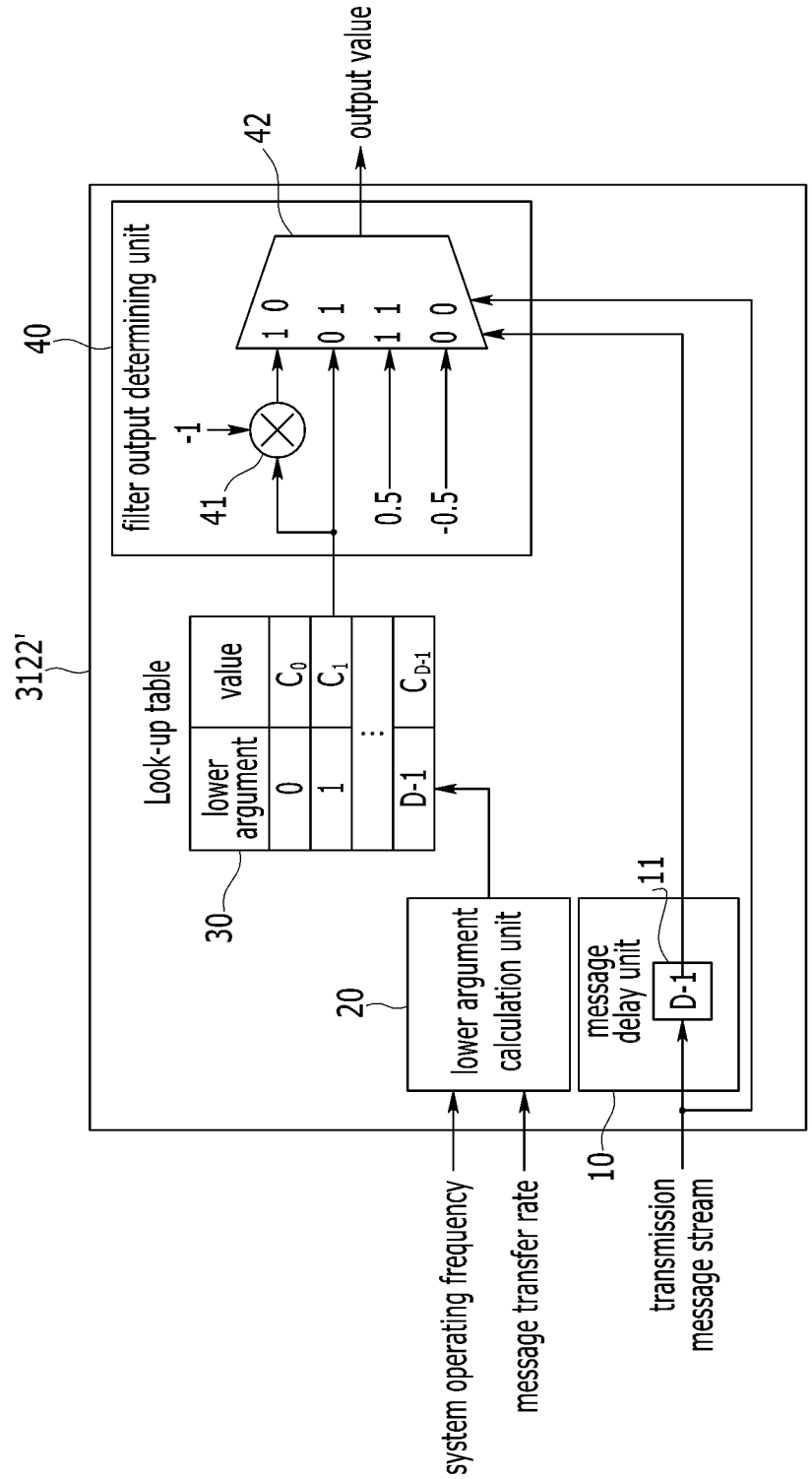
FIG. 6 is a block diagram illustrating a look-up table-based frequency pulse filter according to another exemplary embodiment of the present invention.

FIG. 6 is a block diagram illustrating a look-up table-based frequency pulse filter according to another exemplary embodiment of the present invention.

Referring to FIG. 6, when a result (an output value) of the calculated look-up table is symmetrical or has a constant value with respect to the argument, memory may be used efficiently by reducing the size of the look-up table.

Reflecting these characteristics, a look-up table-based frequency pulse filter 3122' according to another exemplary embodiment of the present invention may include a message delay unit 10, a lower argument calculation unit 20, and a look-up table unit 30 having an abbreviated look-up table, and a filter output determining unit 40. FIG. 6 illustrates a memory-efficient look-up table-based frequency pulse filter 3122' in the case of using a pulse code modulation/frequency modulation (PCM/FM) modulation method, which is one of CPM modulation methods.

The message delay unit 10 may include one delay gate 11 and may delay an input transmission message stream. The message delay unit 10 may output a current transmission message of transmission frame data and a previous transmission message delayed by the delay gate 11 to the filter output determining unit 40. The number of delay gates 11 in the message delay unit 10 may be one, and only an immediately preceding transmission message affects the output of the current transmission message.

The lower argument calculation unit 20 may receive the system operating frequency and message transfer rate and calculate a lower argument using the received system operating frequency and message transfer rate. The lower argument calculation unit 20 may calculate the lower argument using Equation 1 described above, and input the lower argument calculated for each clock having the system operating frequency as a lower argument of the look-up table unit 30.

The look-up table unit 30 may include a look-up table that previously has output values for each lower argument. The look-up table unit 30 may output a value corresponding to a lower argument input from the lower argument calculation unit 20 to the filter output determining unit 40.

The output of the frequency pulse filter for the PCM/FM modulation method may be calculated using Equation 3.

$$Z'_{m',m,d} = \begin{cases} -0.5, & m' = 0, m = 0 \\ C_d, & m' = 0, m = 1 \\ -C_d, & m' = 1, m = 0 \\ 0.5, & m' = 1, m = 1 \end{cases} \quad \text{(Equation 3)}$$

Here, $Z_{m', m, d}$ is an output of the frequency pulse filter, $m' \in \{0,1\}$ is the previous transmission message, $m \in \{0,1\}$ is the current transmission message, d is the lower argument, and $C_d$ is the output value of the look-up table for the lower argument d.

If the current transmission message is the same as the previous transmission message, the output of the frequency pulse filter has a constant value. That is, the output of the frequency pulse filter in the case of (m', m)=(0, 0) is −0.5, and the output in the case of (m', m)=(1, 1) is 0.5.

When the current transmission message is different from the previous transmission message, the output of the frequency pulse filter has the same absolute value and has opposite signs. In other words, $C_d$ if is the output of the frequency pulse filter in the case of (m', m)=(0, 0), the output of the frequency pulse filter in the case of (m', m)=(1, 1) is $-C_d$.

Using these characteristics, in the case of the PCM/FM modulation method, a look-up table may be configured for a case where the current transmission message and the previous transmission message are different. That is, the look-up table unit 30 may configure the look-up table with values corresponding to lower arguments only in a case where the current transmission message and the previous transmission message are different. Accordingly, the size of the look-up table may be reduced and the look-up table may be configured in a memory-efficient manner.

When the current transmission message is 1 and the previous transmission message is 0, the output value $C_d$ of the look-up table for the lower argument d may be calculated using Equation 4.

$$C_d = \frac{1}{4}\left[\cos\left(\frac{(d+D_l)\pi}{D_l}\right) - \cos\left(\frac{d\pi}{D_l}\right)\right], d = 0, 1, \ldots, D_l - 1 \quad \text{(Equation 4)}$$

The look-up table unit 30 may include an output value calculated using Equation 4 when the current transmission message is 1 and the previous transmission message is 0.

The filter output determining unit 40 may determine a final output value using the previous transmission message and the current transmission message transferred from the message delay unit 10 as selection arguments. To this end, the filter output determining unit 40 may include a multiplier 41 and a 4:1 MUX 42.

The multiplier 41 may multiply the value $C_d$ transmitted from the look-up table unit 30 by −1 to create an output value $-C_d$ of the frequency pulse filter in the case of (m', m)=(1, 0), and input the same to the 4:1 MUX 42.

The 4:1 MUX 42 receives the output value $C_d$ of the frequency pulse filter in the case of (m', m)=(0, 0) from the look-up table unit 30, the output value $-C_d$ of the frequency pulse filter in the case of (m', m)=(1, 0) input through the multiplier 41, and 0.5 and −0.5 which are output values when the current transmission message and the previous transmission message are the same. And the 4:1 MUX 42 may select one of the four inputs using the previous transmission message and the current transmission message transmitted from the message delay unit 10 as selection arguments, and output the same as an output value of the look-up table-based frequency pulse filter 3122.

The drawings referred to and the detailed descriptions of the present invention are merely illustrative and have been used to describe the present invention but not intended to limit the scope of the present invention described in claims. Therefore, those skilled in the art will understand that various modifications and other equivalent exemplary embodiments may be made therefrom. Thus, the scope of the present invention should be determined by claims and the equivalent, rather than by the exemplary embodiment described herein.

What is claimed is:

1. An encoder-integrated transmitter comprising:
an encoder-integrated modulation unit including one field programmable gate array (FPGA) to control a measurement circuit, configured to collect measurement data from the measurement circuit to configure transmission frame data, and modulate the transmission frame data into a digital modulation signal; and
an amplifier configured to convert the digital modulation signal into a passband analog radio frequency (RF) signal and then amplify the passband analog RF signal to a high power,
wherein the encoder-integrated modulation unit includes:
a look-up table-based frequency pulse filter configured to calculate an argument according to a stream of the transmission frame data input from the encoder unit and output an output value corresponding to the argument calculated from a look-up table;
a digital integrator configured to digitally integrate a signal output from the look-up table-based frequency pulse filter; and
a quadrature modulator configured to modulate a signal digitally integrated by the digital integrator into an in-phase component and a quadrature component and output the in-phase component and the quadrature component.

2. The encoder-integrated transmitter of claim 1, wherein:
the encoder-integrated modulation unit includes:
an encoder unit configured to control the measurement circuit and collect the measurement data to configure the transmission frame data; and
a modulator configured to modulate the transmission frame data into the digital modulation signal,
wherein the encoder unit generates the transmission frame data as a digital signal.

3. The encoder-integrated transmitter of claim 1, wherein:
the look-up table-based frequency pulse filter, the digital integrator, and the quadrature modulator are operated by a single clock having a system operating frequency.

4. The encoder-integrated transmitter of claim 1, wherein:
the look-up table-based frequency pulse filter includes:
a message delay unit including a plurality of sequentially connected delay gates to sequentially delay and output a stream of transmission frame data;
a lower argument calculation circuit configured to calculate a lower argument using a system operating frequency and a message transfer rate; and
a look-up table unit configured to output an output value corresponding to an argument including an upper argument including an input value of the message delay unit and an output value of each of the plurality of delay gates and the lower argument.

5. The encoder-integrated transmitter of claim 1, wherein:
the look-up table-based frequency pulse filter includes:
a message delay unit configured as one delay gate to output a current transmission message of the transmission frame data and a previous transmission message delayed by the delay gate;
a lower argument calculation circuit configured to calculate a lower argument using a system operating frequency and a message transfer rate;
a look-up table unit including a look-up table that pre-holds output values for each of the lower arguments and configured to output values corresponding to the lower arguments; and
a filter output determining circuit configured to determine an output value using the previous transmission message and the current transmission message transferred from the message delay unit as selection arguments.

6. The encoder-integrated transmitter of claim 5, wherein:
the filter output determining circuit includes:
a multiplier configured to multiply a value transmitted from the look-up table unit by -1; and
a 4:1 MUX configured to selectively output one of the value transmitted from the look-up table unit, the value input through the multiplier, 0.5, and −0.5, using the previous transmission message and the current transmission message as selection elements.

7. The encoder-integrated transmitter of claim 5, wherein:
the lower argument calculating circuit calculates the lower argument using equation $$d_n = \text{Round}\left(\frac{p_n}{f_s} D_l\right), \; p_n = \text{mod}(p_{n-1} + f_b, f_s),$$

and
wherein $f_s$ is a first constant value of the system operating frequency, $f_b$ is a second constant value of the message transfer rate, $D_l$ is a number of lower arguments, Round (a) denotes an integer closest to a, $P_0=0$ mod (a,b) denotes a modulo operation which is, the remainder obtained by dividing a by b.

8. A telemetry system comprising:
a plurality of measurement circuits configured to measure a plurality of status information;
an encoder-integrated modulation unit including one field programmable gate array (FPGA) to control the plurality of measurement circuits, configured to collect measurement data from the plurality of measurement circuits to configure transmission frame data, and modulate the transmission frame data into a digital modulation signal; and
an amplifier configured to convert the digital modulation signal into a passband analog radio frequency (RF) signal and then amplify the passband analog RF signal to a high power,
wherein the encoder-integrated modulation unit includes:
a look-up table-based frequency pulse filter configured to calculate an argument according to a stream of the transmission frame data input from the encoder unit and output an output value corresponding to the argument calculated from a look-up table;
a digital integrator configured to digitally integrate a signal output from the look-up table-based frequency pulse filter; and
a quadrature modulator configured to modulate a signal digitally integrated by the digital integrator into an in-phase component and a quadrature component and output the in-phase component and the quadrature component.

9. The telemetry system of claim 8, wherein:
the encoder-integrated modulation unit includes:
an encoder unit configured to control the measurement circuit and collect the measurement data to configure the transmission frame data; and
a modulator configured to modulate the transmission frame data into the digital modulation signal,
wherein the encoder unit generates the transmission frame data as a digital signal.

10. The telemetry system of claim 8, wherein:
the look-up table-based frequency pulse filter, the digital integrator, and the quadrature modulator are operated by a single clock having a system operating frequency.

11. The telemetry system of claim 8, wherein:
the look-up table-based frequency pulse filter includes:
a message delay unit including a plurality of sequentially connected delay gates to sequentially delay and output the stream of transmission frame data;
a lower argument calculation circuit configured to calculate a lower argument using a system operating frequency and a message transfer rate; and
a look-up table unit configured to output an output value corresponding to an argument including an upper argument including an input value of the message delay unit and an output value of each of the plurality of delay gates and the lower argument.

12. The telemetry system of claim 8, wherein:
the look-up table-based frequency pulse filter includes:
a message delay unit configured as one delay gate to output a current transmission message of the transmission frame data and a previous transmission message delayed by the delay gate;
a lower argument calculation circuit configured to calculate a lower argument using a system operating frequency and a message transfer rate;
a look-up table unit including a look-up table that pre-holds output values for each of the lower arguments and configured to output values corresponding to the lower arguments; and
a filter output determining circuit configured to determine an output value using the previous transmission message and the current transmission message transferred from the message delay unit as selection arguments.

13. The telemetry system of claim 12, wherein:
the filter output determining circuit includes:
a multiplier configured to multiply a value transmitted from the look-up table unit by -1; and
a 4:1 MUX configured to selectively output one of the value transmitted from the look-up table unit, the value input through the multiplier, 0.5, and −0.5, using the previous transmission message and the current transmission message as selection elements.

14. The telemetry system of claim 12, wherein:
the lower argument calculating circuit calculates the lower argument using equation $$d_n = \text{Round}\left(\frac{p_n}{f_s} D_l\right), \; p_n = \text{mod}(p_{n-1} + f_b, f_s),$$

and
wherein $f_s$ is a first constant value of the system operating frequency, $f_b$ is a second constant value of the message transfer rate, $D_l$ is a number of lower arguments, Round (a) denotes an integer closest to a, $P_0=0$ mod (a,b) denotes a modulo operation which is the remainder obtained by dividing a by b.

* * * * *